United States Patent [19]

Tanikella et al.

[11] B 4,001,190
[45] Jan. 4, 1977

[54] ACID-DYEABLE FIBERS OF POLYESTER MODIFIED WITH TETRAMETHYLPIPERIDINE POLYETHER GLYCOLS

[75] Inventors: Murty S. Tanikella, Newark, Del.; Odorich von Susani, Geneva, Switzerland

[73] Assignee: E. I. Du Pont de Nemours and Company, Wilmington, Del.

[22] Filed: Mar. 19, 1975

[21] Appl. No.: 559,701

[44] Published under the second Trial Voluntary Protest Program on March 23, 1976 as document No. B 559,701.

Related U.S. Application Data

[63] Continuation-in-part of Ser. No. 505,952, Sept. 13, 1974, abandoned.

[30] Foreign Application Priority Data

Sept. 17, 1973 Germany .......................... 2346734

[52] U.S. Cl. ................................. 260/75 N; 260/77
[51] Int. Cl.² ........................................ C08G 63/68
[58] Field of Search ............................ 260/75 N, 77

[56] References Cited

UNITED STATES PATENTS

| | | | |
|---|---|---|---|
| 2,647,104 | 7/1953 | Shivers | 260/75 |
| 3,624,181 | 11/1971 | Munakata et al. | 260/860 |

FOREIGN PATENTS OR APPLICATIONS 834,290  5/1960  United Kingdom

*Primary Examiner*—Donald E. Czaja
*Assistant Examiner*—H. H. Fletcher

[57] ABSTRACT

Textile fibers or filaments having improved dyeability are prepared from linear polyesters modified with a minor proportion of 2,2,6,6,-tetramethylpiperidine groups attached in the polymer chain through oxyalkylene linkages at the 1 and 4 positions of the piperidine ring. Alkylene oxide condensates of 2,2,6,6,-tetramethylpiperidine glycols are shown to have adequate heat-stability and compatibility for incorporating in polyesters under conditions of condensation polymerization to form modified polyesters suitable for melt-spinning into desirable products.

10 Claims, No Drawings

ACID-DYEABLE FIBERS OF POLYESTER MODIFIED WITH TETRAMETHYLPIPERIDINE POLYETHER GLYCOLS

REFERENCE TO RELATED APPLICATION

This is a continuation-in-part of application Ser. No. 505,952 filed Sept. 13, 1974, now abandoned.

BACKGROUND OF THE INVENTION

This invention relates to textile fibers and filaments of linear terephthalate polyesters, and is more particularly concerned with products of polyesters modified with basic nitrogen-containing groups to provide improved dyeability with acid dyes.

Although many methods have been tried for improving the acid-dyeability of such polyester fibers and filaments by copolymerization of nitrogen-containing modifiers into the chains of polyester molecules, such previous attempts have not provided adequate solutions to the problem for various reasons. In order to provide good dyeability with acid dyes, the modifier should contain a highly basic nitrogen atom which is suitably positioned as a dye site but which does not form a reactive center for polymer degradation reactions. That is, the basic modifier should be compatible with the polyester and should not result in objectionable discoloration or inadequate molecular weight. The modifier should have sufficient thermal stability for incorporation in the polyester during condensation polymerization and for melt-spinning into filaments. The amount of modifier required for good dyeability should not be so great as to dilute desirable physical properties of the polyester, and the modifier should have low volatility to prevent escape with low-boiling compounds removed during the condensation polymerization. The melt-spun filaments should retain a high level of dyeability when subjected to heat-setting treatment after drawing. The dyed filaments and fibers should have good dye-lightfastness and resistance to removal by washing or dry cleaning.

SUMMARY OF THE INVENTION

The present invention provides improvements in the above respects in acid-dyeable fibers and filaments of polyester modified with nitrogen-containing compounds. Any of the polyesters known to be useful in textile fibers or filaments can be modified by this invention to impart good acid-dyeability. By "acid-dyeable" is meant that the filaments have an affinity for acid dyes.

In accordance with this invention, the modified polyester comprises, as integral components in linear polyester chains, a minor proportion (preferably sufficient to provide at least 0.05 to 0.25 weight percent nitrogen based on the weight of modified polyester) of 2,2,6,6-tetramethylpiperidine groups linked to dicarboxylate chain units through substituents at both the 1 and 4 positions of the piperidine ring which contain oxyethylene units. The total number of oxyethylene units in such linking substituents on tetramethylpiperidine groups in the polyester should average at least 10 oxyethylene units (preferably no more than 80) per tetramethylene group.

The polyester preferably comprises at least 85 mole percent ethylene terephthalate units. The modified polyester may also comprise up to 10 weight percent ethylene adipate or ethylene glutarate units, at least 2 weight percent often being desirable for further improvement in dyeability.

A modified polyester preferably contains chain segments represented by the following formula:

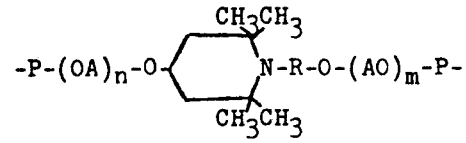

wherein P represents a segment of a polyester chain having a terminal carbonyl group; $-(OA)_n-$ and $-(AO)_m-$ represent divalent groups of $n$ and $m$ oxyalkylene units which contain a total of at least about 10 oxyethylene units; and R is a saturated aliphatic divalent hydrocarbon group of 2 to 18 carbon atoms. The oxyalkylene units may be a mixture of oxyethylene and oxypropylene units of which preferably at least one-half are oxyethylene units.

Preferred modifiers are alkylene oxide condensates of 1-(2-hydroxyethyl)-2,2,6,6-tetramethyl-4-hydroxypiperidine and 1-(2-hydroxy-2-methylethyl)-2,2,6,6-tetramethyl-4-hydroxypiperidine.

DETAILED DESCRIPTION

The acid-dyeable polyester fibers and filaments of this invention are characterized by the presence of 2,2,6,6-tetramethylpiperidine groups in the chain of at least some of the polyester molecules. These acid-dyeable polyesters are surprisingly free from undesirable discoloration. This unexpected achievement is believed to be due, at least in part, to the basicity of the piperidine nitrogen atom, which leads to strong dye-polymer interactions, and to the presence of the 2,2,6,6-tetramethyl substituents on the piperidine ring which hinder the approach of reactive centers which cause polymer degradation, for example, discoloration and quaternization reactions, to occur. In addition, the novel tetramethylpiperidine diols used in the practice of the present invention can be copolymerized readily into polyesters and thus their use does not limit molecular weight as does the use of monofunctional modifiers.

Nitrogen-containing compounds for preparing modified polyesters of the present invention are obtained by reacting 2,2,6,6-tetramethyl-4-hydroxypiperidine with a compound that will introduce an hydroxyalkyl group on the nitrogen atom of the piperidine ring to produce a tetramethylpiperidine glycol and then reacting alkylene oxide with the 2,2,6,6-tetramethylpiperidine glycol to form alkylene oxide condensates which are tetramethylpiperidine polyether glycols. The alkylene oxide is preferably ethylene oxide but may be a mixture of ethylene oxide with another alkylene oxide, e.g., a mixture of ethylene oxide with propylene oxide is suitable. The alkylene oxide condensates should contain an average of at least 10 oxyethylene units per tetramethylpiperidine group. They may contain up to about 120 oxyalkylene units but will preferably contain no more than an average of 80 oxyalkylene units per tetramethylpiperidine group in order to avoid excessive dilution of the polyester. When a mixture of alkylene oxide condensates are present in a condensate, preferably at least one-half of them are oxyethylene units, and there should also be an average of at least 10 oxyethylene units per tetramethylpiperidine group.

When the number of oxyethylene units per tetramethylpiperidine group is less than about 10, the polyester may be relatively hydrophobic and the full potential of the dye site may not be realized in aqueous baths, particularly at pH levels such as pH 4 to 6 and above. With an average number of oxyethylene groups greater than about 10 in the alkylene oxide condensates used to prepare the polyesters, the polyesters have significantly greater hydrophilicity which leads to a fuller utilization of the highly basic dye site. An average number of oxyethylene units per tetramethylpiperidine group of about 10 to about 40 is generally desirable. If desired, the alkylene oxide condensate used to provide a modified polyester may be a mixture of monohydric alcohols and diols containing the tetramethylpiperidine ring. The alkylene oxide condensates can be reacted with preformed polyester or added at any time during formation of the polyester to introduce the alkoxylated tetramethylpiperidine group into polyester molecules.

The acid dyeability of the polyester composition is dependent on other factors in addition to the base strength of the amine used in its preparation. In general, polyester compositions prepared with a given tetramethylpiperidine diol will have increasing dyeability with increasing nitrogen content, with increasing oxyalkylene content at constant nitrogen content, and with increasing content of a conventional copolymerizable compound. The acid-dyeable fibers and filaments of this invention that can be acid dyed at a pH of 3.5 and above are preferred embodiments and those that can be dyed at a pH of 4.5 and above are especially preferred. Of course, lower pH values, e.g., 3.0, can be used when desired.

The tetramethylpiperidine polyether glycol used in this invention must exhibit good thermal stability, since polyester preparation and melt-spinning are carried out at elevated temperatures, e.g., temperatures within the range of 240°–300°C. When the tetramethylpiperidine compound is added to polyester-forming compositions, it should be able to withstand temperatures on the order of 280°C. and up, since such temperatures are required for efficient polymer production. The modifier compounds of this invention do not undergo thermal degradation to produce colored by-products or decomposition products having an adverse effect on polyesters such as, for example, causing excessive reduction in polymer molecular weight.

In addition, tetramethylpiperidine polyether glycols used to provide the acid sites must be compatible with polyesters. The polyester compatibility of the modifier compounds containing the 2,2,6,6-tetramethylpiperidine group has been found to be surprisingly good. These modifier compounds can be reacted with polyesters or polyester-forming compositions at elevated temperatures without the development of objectionable discoloration or adverse reduction of molecular weight.

Suitable tetramethylpiperidine polyether glycols for use in the practice of the present invention can be obtained by reacting ethylene oxide, or a plurality of alkylene oxides such as ethylene oxide and propylene oxide, with one or more tetramethylpiperidine glycols having the formula:

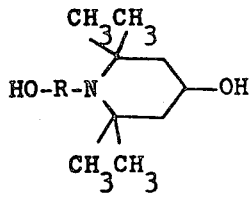

where R is a divalent aliphatic hydrocarbon group containing from 2 to 18, preferably 2 to 3, carbon atoms. The alkylene oxide condensate is obtained by condensing an alkylene oxide with a tetramethylpiperidine glycol in the presence of a catalyst. As suitable catalysts, there may be mentioned sodium hydride, potassium hydride and lithium aluminum hydride. Mixed alkylene oxides can be used or, if desired, condensation can be carried out with one alkylene oxide to add a given amount of oxyalkylene units and then a different alkylene oxide used for further condensation. Preferably, the alkylene oxide is ethylene oxide or a combination of oxides in which ethylene oxide constitutes at least half of the alkylene oxides. The catalyzed addition of an alkylene oxide to one of the above compounds will not produce a single compound, but rather a mixture of compounds having various numbers of oxyalkylene units and, accordingly, such mixtures are characterized by stating an average number of oxyalkylene units. As is known, primary alcohols condense with alkylene oxide at a faster rate than secondary alcohols and thus, when both are present, the final distribution of products will be effected accordingly.

The tetramethylpiperidine glycols of formula I can be obtained by the uncatalyzed reaction of the corresponding secondary amines and an alkylene oxide such as, for example, ethylene oxide or propylene oxide. The tetramethylpiperidine glycols of formula I can also be prepared by reacting the secondary amine with a halogen-containing alkanol such as, for example, 2-chloroethanol. These reactions to produce the tetramethylpiperidine glycols should be carried out at elevated temperatures and pressures to increase the rate of the reaction.

Under the polymer-forming conditions employed in the practice of the present invention, the alkylene oxide condensates react and become part of the polymer chain and their presence in polyester fibers is permanent and they cannot be removed by washing, dry cleaning and the like.

The nitrogen content of the acid-dyeable polyesters should be at least 0.05%, by weight, based on the weight of the modified polyester. Preferably, the weight percent nitrogen will be 0.05% to 0.25%, and more preferably, 0.05% to 0.15%.

Polymerization accelerators, such as diphenylterephthalate, may be used if desired. Salts of the tetramethylpiperidine modifier compounds with acids of phosphorus also may be used in the practice of the invention. Suitable acids include phosphoric acid, diphenylphosphinic acid, phenylphosphonic acid, and the like.

By polyesters is meant fiber-forming linear condensation polymers characterized by carbonyloxy linking radicals

in the polymer chain. In the absence of an indication to the contrary, a reference to polyesters is meant to encompass copolyesters, i.e., polyesters made using 3 or more reactants, each having 2 ester-forming groups. The polyesters may, if desired, contain additives, e.g., delustrants, viscosity boosters, optical brighteners, toning pigments, antioxidants, and the like. In addition, filaments prepared from these polymers may encompass various cross-sectional configurations such as round, multilobal or hollow.

Examples of linear, fiber-forming condensation polyesters can be modified in accordance with the present invention are poly(ethylene terephthalate), poly(trimethylene terephthalate), poly(2,2-dimethylpropylene terephthalate), poly(tetramethylene terephthalate), poly(ethylene terephthalate/isophthalate) (85/15), poly(ethylene terephthalate/hexahydroterephthalate) (90/10), poly(hexahydro-p-xylylene terephthalate), poly(ethylene/hexahydro-p-xylylene terephthalate) (90/10), terephthalate copolyesters containing an aliphatic dicarboxylic acid constituent (especially terephthalate/adipate and terephthalate/glutarate copolyesters) and terephthalate copolyesters containing a branched-chain glycol constituent (especially ethylene/2,2-dimethylpropylene terephthalate copolyesters). Modified ethylene terephthalate and the modified ethylene terephthalate copolyesters are preferred embodiments of the present invention.

This invention is also important with respect to providing acid-dyeable fibers of copolyesters containing at least 85 mol percent of ethylene terephthalate units, since filaments of copolyesters such as, for example, terephthalate /adipate copolyesters retain a relatively high level of their dyeability when subjected to heat-setting treatments after they have been drawn.

As indicated above, polymer compositions containing the 2,2,6,6-tetramethylpiperidine group are basic compounds and, as such, have a relatively high affinity for acid dyes and can be dyed in a range of colors. As illustrations of such acid dyes, there may be mentioned C.I. Acid Blue 25 (C.I. 62055), C.I. Acid Red 4 (C.I. 14710), C.I. Acid Yellow 40 (C.I. 18950), and C.I. Acid Green 25 (C.I. 61570). Fibers of these polymer compositions can be combined with other polyester fibers to provide fabrics that can be dyed to multicolors in a single dye bath. In general, the dyed fibers of the present invention have a good dye lightfastness.

The dyeability of the filaments of this invention may be determined by measuring the amount of dye left in the dye bath after dyeing in a standard manner. The whiteness of the filaments may be measured by means known to those skilled in the art, for example, reflectance determination using a reflectometer. In general, whiteness will improve as the purity of the compounds used is improved and will improve by following known practices for avoiding degradation and by minimizing the exposure of the compositions to oxygen at elevated temperatures. If desired, toners and brighteners can be added to increase fiber whiteness.

The polyester compositions used in this invention usually will have a relative viscosity between 7.5 and 85; preferably the relative viscosity will be from about 11 to about 30. The relative viscosity is determined by measuring the ratio of the viscosity of a solution containing 4.75% by weight of the polymer, in hexafluoroisopropanol containing 100 parts per million, by volume, of concentrated sulfuric acid, to the viscosity of the hexafluoroisopropanol sulfuric acid solvent measured in the same units at 25 ± 0.05°C.

The nitrogen content of the modified polyesters is determined using the micro Kjeldahl method of analysis.

In the procedures and examples that follows, all percentages given are by weight based on total weight except as indicated otherwise, and in the examples all scour and dye baths use a bath-to-sample fabric, yarn, skein weight ratio of 40:1, except as indicated otherwise, and the wetting agent used is octylphenol condensed with 9–10 mole of ethylene oxide. Also, the expression "cut to flake and solid-phase polymerized" means the polymer was cut to flake in an Abbe' rotary cutter (Abbe' Engineering Co., New York, N. Y.) and passes through a perforated metal screen having holes 0.125-inch (0.318 centimeter) in diameter and this flake is solid-phase polymerized by heating it at 190°C. at less than 5 torr, except as indicated otherwise, for the indicated period of time. If the flake is stored, rather than used, following its preparation, it is dried prior to spinning. Unless otherwise indicated, the dye carrier used in the examples is a composition comprising about 50% methyl p-toluate, 25% methyl benzoate and 25% biphenyl. Filaments prepared in the examples have a low level of color; i.e., while they are not pure white, the color is acceptable for commercial use.

PREPARATION OF TETRAMETHYLPIPERIDINE GLYCOLS

Representative procedures for preparation of 2,2,6,6-tetramethylpiperidine glycols used in the practice of this invention are given below:

1-(2-Hydroxyethyl)-2,2,6,6-Tetramethyl-4-Hydroxypiperidine

METHOD I

A sample of 157 grams of 2,2,6,6-tetramethyl-4-hydroxypiperidine is placed in a 400-milliliter stainless steel bomb, which is cooled to −78°C. The bomb is evacuated, filled with nitrogen at atmospheric pressure, and re-evacuated. The bomb is placed on a scale and connected to a supply of ethylene oxide by a flexible tube. Ethylene oxide is allowed to pass into the bomb until the increase in weight is 52 grams. The bomb is then sealed and disconnected from the ethylene oxide supply. The bomb is held at 110°C. for 1 hour, 120°C. for 1 hour, 130°C. for 1 hour and at 155°–160°C. for 4 hours. The bomb and charge are cooled, and 204 grams of product are removed. The crude material is sublimed twice at 150°C. and less than 1 torr to give 1-(2-hydroxethyl)-2,2,6,6-tetramethyl-4-hydroxypiperidine as a white product melting at 180°–183°C.

Additional preparative information for a larger-scale production of this product is given in the section on preparation of piperidine condensates.

METHOD II

In a heavy-wall, polymer tube is placed 2,2,6,6-tetramethyl-4-hydroxypiperidine and 2-chloroethanol in a molar ratio of 1 to 3. The tube is purged with nitrogen, evacuated and sealed. It is then heated in a salt bath at 160°C. for 1 hour. The contents become a clear solution at 130°–140°C. and start forming the hydrochloride salt at 150°–160°C. At the end of the heating period, the seal of the tube is broken and the contents repeatedly washed with ether. The remaining hydrochloride salt is then dissolved in water and the solution made strongly basic with aqueous potassium hydroxide and extracted 4 times with ether. The four ether layers are combined, dried over potassium carbonate and the ether distilled. The solid, a combination of unreacted piperidine and the 2-hydroxyethyl derivative, is purified by sublimation. Unreacted piperidine is removed by sublimation at 100°C. at about 0.1-torr. The remaining solid is the 1-(2-hydroxyethyl)-2,2,6,6-tetramethyl-4-hydroxypiperidine and is sublimed at 135°C. at about 0.1-torr. The material melts at 169° to 174°C.

1-(2-Hydroxy-2-Methylethyl)-2,2,6,6-Tetramethyl-4-Hydroxypiperidine

To a 400-milliliter stainless steel bomb is added 117.5 grams of 2,2,6,6-tetramethyl-4-hydroxypiperidine. The bomb and charge are cooled to −78°C., and the bomb is evacuated; filled with nitrogen at atmospheric pressure and re-evacuated. A dropping funnel is attached to the bomb and 60 grams of 1,2-propylene oxide is added, as determined by the weighing of the bomb before and after the addition. The bomb is then sealed and held at 110°C. for 1 hour, 125°C. for 1 hour, 140°C. for 1 hour and 155°–160°C. for 8 hours. The bomb is then cooled and 164 grams of product is removed. This product is placed in a flask and the pressure reduced to permit the removal of 6 grams of excess propylene oxide yielding 158 grams of 1-(2-hydroxy-2-methylethyl)-2,2,6,6-tetramethyl-4-hydroxypiperidine.

PREPARATION OF ALKYLENE OXIDE CONDENSATES OF TETRAMETHYLPIPERIDINE GLYCOLS

Representative procedures for preparation of tetramethylpiperidine polyether glycols used in the practice of this invention are given below:

1-(2-Hydroxyethyl)-2,2,6,6-Tetramethyl-4-Hydroxypiperidine Condensed With Ethylene Oxide in a Molar Ratio of 1:11 (ETHP-11EO)

A 5-liter flask fitted with a thermometer and a capillary nitrogen inlet is weighed, and a charge of 199.5 grams of 1-(2-hydroxyethyl)-2,2,6,6-tetramethyl-4-hydroxypiperidine and 39.8 grams of the dimethyl ether of diethylene glycol (to depress the melting point of the piperidine alcohol) is placed in the flask and the mixture swept with nitrogen. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The charge is heated to a temperature of 140°C. and 0.25 gram of sodium hydride dispersed in 0.25 gram of mineral oil is added. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight gain after addition. The weight gain is 474 grams. After the addition is complete, the flask is swept with nitrogen and cooled below 50°C. and 0.62 milliliter of acetic acid is added to quench the catalyst. The product is calculated to contain an average of 10.7 oxyethylene units per piperidine group and 5.6% of the dimethyl ether, and is referred to as ETHP-11EO.

1-(2-Hydroxyethyl)-2,2,6,6-Tetramethyl-4-Hydroxypiperidine Condensed with Ethylene Oxide in a Molar Ratio of 1:19 (ETHP-19EO)

A charge of 155 pounds (70.5 kilograms) of 2,2,6,6-tetramethyl-4-hydroxypiperidine is placed in a stainless steel reactor equipped with a stirrer and 75 pounds (34 kilograms) of diethylene glycol dimethyl ether is added. The pressure in the reactor is reduced to 0.15-atmosphere and the reactor is then pressurized to 15 pounds per square inch (1.05 kilograms per square centimeter) gauge with nitrogen. The evacuation is repeated and the pressure is adjusted to 3 pounds per square inch (0.21-kilogram per square centimeter) gauge with nitrogen. The purged charge is stirred and heated to 125°C.; a sample taken at this point contains less than 0.2% water.

Ethylene oxide, 48 pounds (22 kilograms), is added at 125°C. at such a rate that the temperature rises to 145 to 155°C. The reactor is equipped with valves such that the ethylene oxide flow is stopped if the pressure exceeds 30 pounds per square inch (2.1 kilograms per square centimeter) gauge or if the temperature exceeds 150°C. The charge is stirred at not less than 125°C. for 8 hours. A sample taken at this point contains not more than 1% unreacted 2,2,6,6-tetramethyl-4-hydroxypiperidine.

The catalyst, 0.25-pound (0.11 kilogram) of sodium hydride dispersed in 0.25-pound (0.11 kilogram) of mineral oil is added at 125°C. and the charge is stirred and swept with nitrogen for 1 hour. The evacuation and pressurization described above is then repeated, and 835 pounds (378 kilograms) of ethylene oxide is added as described above. The ethylene oxide feed is shut off and the pressure is allowed to reduce via reaction of the ethylene oxide.

The charge is allowed to cool to 115°C., the reactor is evacuated to 15 pounds per square inch (1.05 kilograms per square centimeter), pressurized with nitrogen to 20 pounds per square inch (1.4 kilograms per square centimeter) gauge, re-evacuated to 15 pounds per square inch (1.05 kilograms per square centimeter) and re-pressurized with nitrogen to 20 pounds per square inch (1.4 kilograms per square centimeter). A sample taken at this point is analyzed by nuclear magnetic resonance, and contains 18–22 units per piperidine group of condensed ethylene oxide. This product is referred to as ETHP-19EO.

Acetic acid, 0.62 pound (0.28 kilogram) is then added and the charge is stirred for one hour. It is then cooled to 70°C. and discharged to containers.

1-(2-Hydroxyethyl)-2,2,6,6-Tetramethyl-4-Hydroxypiperidine Condensed With Ethylene Oxide in a Molar Ratio of 1:36 (ETHP-36EO) and in a Molar Ratio of 1:114 (ETHP-114EO)

Into a 0.5-liter flask equipped with a thermometer, a mechanical stirrer, a gas-feed tube and a vertical condenser having a bubbler attached to its exit tube, is placed a charge of 76.5 grams of ETHP-19EO. The charge is heated to 150°C. and purged with nitrogen for 1 hour while maintaining the temperature at 150°C. The charge is cooled, 0.1 gram of sodium hydride in 0.1 gram of mineral oil is added and the charge is reheated to 150°C. Ethylene oxide gas, 130 grams, is added. A portion of the material is removed, and the catalyst in this portion is quenched with 0.2 milliliter of acetic acid. The waxy product has a neutralization equivalent of 1792, and is referred to as ETHP-36EO.

The charge of ETHP-36EO remaining in the apparatus, 74 grams, is further treated with 155 grams of ethylene oxide at 150°C. The charge is cooled to 100°C. and the catalyst is quenched with 0.2 milliliter of acetic acid. The waxy solid has a neutralization equivalent of 5,201, and is referred to as ETHP-114EO.

1-(2-Hydroxy-2-Methylethyl)-2,2,6,6-Tetramethylethyl)-2,2,6,6-Tetramethyl-4-Hydroxypiperidine Condensed With Ethylene Oxide in a Molar Ratio of 1:19 (PTHP-19EO)

A 5-liter flask fitted with a thermometer and a capillary nitrogen inlet is weighed and a charge of 1-(2-hydroxy-2-methylethyl)-2,2,6,6-tetramethyl-4-hydroxypiperidine is placed in the flask. The setup is warmed at 90°C. and held at 1-2 torr for 0.5-hour to remove water and volatile acidic components, such as carbon dioxide. The charge is cooled and reweighed; the charge residue weighs 155 grams. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The apparatus is purged with nitrogen for 10 minutes, and then heated to a temperature of 100°C. and 0.5 gram of sodium hydride dispersed in 0.5 gram of mineral oil is stirred in and the charge is purged with nitrogen. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight of flask and contents after addition. After the addition is complete, the flask is swept with nitrogen and cooled below 50°C. The condenser is removed and the flask weighed. The weight gain is 600 grams. Acetic acid, 1.25 milliliters, is then added and the mixture is stirred for 10 minutes to quench the catalyst. The product is calculated to contain an average of 19 oxyethylene units per piperidine group and is referred to as PTHP-19EO.

1,2,2,6,6-Pentamethyl-4-Hydroxypiperidine Condensed With Ethylene Oxide in a Molar Ratio of 1:28 (PHP-28EO)

This condensate is prepared in the manner described for PTHP-19EO with a charge of 1,2,2,6,6-pentamethyl-4-hydroxypiperidine being placed in the flask. The charge residue weighs 500 grams, and 0.75 gram of sodium hydride dispersed in 0.75 gram of mineral oil, 3751 grams of ethylene oxide, and 1.88 grams of acetic acid are used. The product is a wax, of average molecular weight of 1917 grams, which is calculated to have an average of 28.3 oxyethylene units per piperidine group. It is referred to as PHP-28EO.

EXAMPLE I

This example illustrates the use of ETHP-19EO in preparing acid-dyeable polyester filaments. Modified homopolymer and copolymer filaments are exemplified.

A. Modification of Poly(ethylene terephthalate)

A portion of di(2-hydroxyethyl) terephthalate equivalent to 150 grams of polyethylene terephthalate is partially polymerized in a glass flask at 272° to 276°C. by reducing the pressure to 1 torr over a 57-minute period. The vessel is pressurized to atmospheric pressure and 9.27 grams of ETHP-19EO are added. After stirring 5 minutes at atmospheric pressure under nitrogen, the pressure is reduced to 0.08-torr over a 19-minute period. Polymerization is continued at 0.08-torr at 279 to 281°C. for 1 hour and 35 minutes. The polymer has a relative viscosity of 25.6 and contains 0.090% nitrogen.

The polymer is spun to a 14-filament yarn at 268°C. and is wound up at 225 yards (205.7 meters) per minute. The yarn is drawn 5.2X using two feed rolls heated at 66°C. (hot pin) and two draw rolls heated at 123°C. The yarn has a relative viscosity of 19.7. The yarn is knit to a jersey fabric and the fabric relaxed 5 minutes at 180°C. The fabric is dyed 90 minutes at 100°C. at pH 4.0 with 10% on weight of fabric (owf) biphenyl carrier and 3% owf of Acid Blue 40 (C.I. 26125), using a bath-to-fabric weight ratio of about 100:1. The fabric dyes to a medium shade.

B. Modification of a Terephthalate/Adipate Copolymer

Monomer is prepared from 1010 grams of dimethyl terephthalate, 645 milliliters of ethylene glycol and 0.454-gram of $Mn(C_2H_3O_2)_2 \cdot 4H_2O$ and 0.312-gram of $Sb_2O_3$ in 52 milliliters of ethylene glycol. The mixture is heated in a flask arranged for stirring and distillation, until 415 milliliters of methanol (332 grams) is removed. Then 0.215-gram of commercial 85% $H_3PO_4$ in 21 milliliters of ethylene glycol and 31.1 grams of adipic acid are added. Distillation is continued until the vessel reaches 241°C. and 160 grams of additional distillate is collected. The monomer product is cooled and broken into small pieces.

Monomer product, equivalent to 150 grams of polymer, is partially polymerized at 275° to 277°C. by reducing the pressure to 1 torr. The vessel is pressurized with nitrogen and 9.16 grams of ETHP-19EO are added. Polymerization is continued at 276° to 279°C. at 0.08-torr for 1 hour and 16 minutes. This polymer has a relative viscosity of 25.5 and contains 0.086% nitrogen and 4.27 mole % adipate units.

The polymer is then spun into a 14-filament yarn at 278°C. and wound up at 119 yards (108.8 meters) per minute. The yarn is drawn 5.6X as it passes from a feed roll heated at 70°C. at 18 yards (16.5 meters) per minute over a plate heated at 90°C. and a draw roll heated at 118°C. at 101 yards (92.4 meters) per minute. The yarn is relaxed at 180°C. for 5 minutes. This yarn has a tenacity of 2.3 grams per denier and an elongation of 88%. The yarn is dyed 90 minutes at 100°C. at pH 4.0 with 3% on weight of yarn (owy) Acid Blue 40 (C.I. 62,125), using a bath-to-yarn weight ratio of about 100:1. The yarn dyes to a medium shade. Using 10% owy biphenyl carrier under the same conditions, the yarn dyes to a medium-dark shade of blue.

C. Modification of a Glycol Terephthalate Copolymer

In a test tube are placed 7.8 grams of ETHP-19EO and 75 grams of a random copolyester having a relative viscosity of 25.5. The copolyester contains 90 mole percent ethylene terephthalate units and 10 mole percent 2,2-dimethylpropylene terephthalate units. The tube is purged of air with nitrogen, brought to 255°C. under nitrogen at atmospheric pressure and stirred for 0.5-hour after the contents are melted. Then a pressure of less than 1 torr is applied, and stirring is continued for 1.0 hour, after which the sample is cooled under nitrogen at atmospheric pressure. The polymer is cut to flake. This polymer contains 0.125% nitrogen. The polymer is then solid-phase polymerized for 70 hours at 190°C. and less than 1 torr. The polymer then has a relative viscosity of approximately 83.8.

The polymer is spun into a 5-filament yarn at a block temperature of 279°C. and a spinneret temperature of 275°C.

In a separate step, the yarn is drawn 3.5X on a hot pin at 85°C. The feed roll speed is 16.7 yards (15.3 meters) per minute, the draw roll speed is 58.3 yards (53.3 meters) per minute and the wind-up roll speed is 58.3 yards (53.3 meters) per minute. The drawn yarn is found to have a denier of 54.6, a tenacity of 2.1 grams per denier and elongation of 70%. The yarn is then knit into fabric.

The fabric is scoured for 30 minutes at-the-boil in a bath contaning 1 percent wetting agent and 1 percent tetrasodium pyrophosphate, and then rinsed with hot water.

Three fabric samples are dyed in baths havng a pH of 3.0, 4.5 and 6.0 at 121°C. for 90 minutes and two fabric samples dyed in baths having pH of 3.0 and 4.5 at 100°C. All of the baths contain 15% owf of dye carrier and 2% owf C.I. Acid Blue 25 (C.I. 62055). The dyed fabrics are scoured 30 minutes at 82°C. in a bath containing, by weight, 1% of the wetting agent and 0.5% acetic acid. The fabric dyed at pH 6.0 is a medium-deep shade of blue; all others are a deep shade of blue.

EXAMPLE II

This example illustrates the use of ETHP-11EO in preparing acid-dyeable polyester filaments.

A. Modification of Poly(ethylene terephthalate)

In a 2-liter, three-necked flask are mixed 25.7 grams of ETHP-11EO and 500 grams of a polyethylene terephthalate prepolymer with a relative viscosity of 3.2. The flask is evacuated and re-filled with nitrogen ten times. The charge is melted at 283°C. and stirred under nitrogen at atmospheric pressure. The pressure is slowly reduced to less than 1 torr, and the charge is stirred at this pressure for 2 hours. The polymer is cooled under nitrogen and is cut to flake. The flake has a relative viscosity of 20.3, and contains 0.10% nitrogen.

The flake is dried and spun to five-filament yarn at a spinneret temperature of 279°C., and the yarn is wound up undrawn at 150 yards (137 meters) per minute. The yarn is drawn 5X in two stages. The yarn passes from a feed roll at 16.7 yards (15.2 meters) per minute over a hot pin at 50°C. to a first-stage roll at 50 yards (45.7 meters) per minute, over a hot plate at 70°C. to a second stage roll at 83.3 yards (76.2 meters) per minute, and is wound up at 81.7 yards (74.6 meters per minute. The resulting 30.5 denier yarn has a tenacity of 2.9 grams per denier and an elongation of 23%. The yarn is knit into fabric and the fabric is scoured and pressure dyed at a pH of 3.5 and 4.5 using the procedure described in Ex. 1C. The fabric dyes to a medium shade at both pH values.

B. Modification of Terephthalate/Adipate Copolymers

Using essentially the same preparative procedure described in Example IB, except that ETHP-11EO is added, there is produced a modified ethylene terephthalate/adipate polyester. The polymer has a relative viscosity of 22.6, contains 0.066% nitrogen and 4.07 mole % adipate units.

Yarn is spun, drawn and relaxed by essentially the same manner as described in Example IB, except that the draw ratio used is 5.4X. This yarn has a tenacity of 2.5 grams per denier and an elongation of 75%. The yarn is dyed at 100°C. for 90 minutes at pH 4.0 with 10% owy biphenyl carrier and 3% owy Acid Blue 40 (C.I. 62125) using a bath-to-yarn weight ratio of about 100:1. The yarns dyes to a light-medium shade of blue.

Another modified ethylene terephthalate/adipate polymer is made with ETHP-11EO that contains a higher level of adipate units.

A supply of an ethylene terephthalate/adipate monomer is prepared using the following procedure. A mixture of 1050 grams of dimethyl terephthalate, 670 milliliters of ethylene glycol and 54 milliliters of a catalyst solution containing 0.472 gram of $M_n(C_2H3O_2)_2 \cdot 4H_2O$ and 0.312 gram of $Sb_2O_3$. After removing by distillation about 420 milliliters of methanol by heating the ingredients to about 218°C., 21 milliliters of glycol solution containing 0.215 gram of commercial 85% $H_3PO_4$ and 62 grams of adipic acid are added. Distillation is continued until the pot temperature reaches 242°C. Total distillate is about 555 grams. The molten monomer product is poured into shallow dishes, allowed to cool, and broken up into small pieces.

Monomer product prepared as described above, equivalent to 150 grams of copolymer, is partially polymerized by stirring and heating at 270°-278°C. while slowly reducing the pressure to 1 torr. The vessel is pressurized with nitrogen and 5.33 grams of ETHP-11EO is added. After stirring about 5 minutes, the pressure is reduced to 0.1-torr and polymerization continued at 276°-280°C. for about 2 hours. The polymer is cooled under nitrogen and ground to 20 mesh. This polymer has a relative viscosity of 23.3 and contains 0.072% nitrogen and 7.2 mole % adipate units.

Yarn is spun and drawn by essentially the same manner as described in Example IB except that the draw ratio is 5.5X. This yarn has a tenacity of 1.4 grams per denier and an elongation of 150%. The yarn is dyed to a dark shade when dyed for 90 minutes at 100°C. at pH 4.0 with 10% owy biphenyl carrier and 3% owy of Acid Blue 40 (C.I. 62125) using a bath-to-yarn weight ratio of about 100:1.

EXAMPLE III

This example illustrates the use of PTHP-19EO in preparing acid-dyeable filaments.

A monomer supply is prepared in a 3-neck flask equipped with a stirrer and arranged for distillation. It is prepared by ester exchange of 1,050 grams of dimethyl terephthalate, 670 milliliters of ethylene glycol and a catalyst solution consisting of 0.472-gram of $Mn(C_2H_3O_2)_2 \cdot 4H_2O$ and 0.324-gram of $Sb_2O_3$ in 54 milliliters of ethylene glycol. The ingredients are heated to about 215°C. and 327 grams of methanol removed by distillation. There is then added 62 grams of adipic acid and 21 milliliters of a solution contaning 0.215-gram of commercial 85% phosphoric acid in ethylene glycol. The temperature is increased to about 250°C. with continuing distillation; the total distillate is about 510 grams. When the temperature reaches 250°C., the molten monomer product is poured into shallow dishes, cooled and broken into small pieces.

Into a 3-neck, 500 milliliter, round botton flask equipped with stirrer, vacuum distillation head and nitrogen inlet, is placed 188 grams of the monomer product, and the monomer partially polymerized by heating at 272° to 279°C., with stirring, while reducing the pressure to 1 torr. The flask is pressurized to atmospheric pressure with nitrogen and 9.1 grams of PTHP-19EO are added. The contents are stirred about 5 minutes and the pressure reduced over a 30-minute period to 0.1-torr and polymerization continued at 274 to 281°C. for about 1.75 hours. The polymer is cooled under nitrogen, ground and sieved to a particle size of 10 mesh. The polymer has a relative viscosity of 19.7 and contains 0.094% nitrogen and 8 mole % adipate units.

The 10-mesh polymer is spun into a 14-filament yarn at a block temperature of 263°C. and the yarn wound to a package at 121 yards (110.6 meters) per minute. The yarn is removed from the package, passed to a feed roll heated at 50°C., to a second feed roll heated at 52°C. and then to two draw rolls heated at 94°C. The speed of the draw rolls is 100 yards (91.4 meters) per minute and the draw ratio is 5.5. The drawn filaments are heated at 180°C. for 5 minutes to give a relaxed yarn having a denier of 148, a tenacity of 1.5 grams per denier and an elongation of 86%. The yarn dyes to a dark shade without carrier when dyed 90 minutes at 100°C. at pH 4 in a bath containing 3% owy of C.I. Acid Blue 40 (C.I. 62125) using a bath-to-yarn weight ratio of about 100:1.

EXAMPLE IV

This example illustrates the use of ETHP-36EO in preparing acid-dyeable polyester filaments.

In a 2-liter, three-necked flask are mixed 26 grams of ETHP-36EO, 500 grams of di(2-hydroxyethyl)terephthalate, and 0.28 gram of antimony oxide in 20.0 milliliters of ethylene glycol. The flask is alternately evacuated to less than 2 torr and filled with nitrogen to atmospheric pressure five times. The flask is lowered into a salt bath at 250°C. and, when the monomer is molten, vacuum is applied to cause distillation of ethylene glycol. (The loss of some di(2-hydroxyethyl)terephthalate at this point is unavoidable.) When the pressure has been reduced to less than 1 torr, the temperature is raised to 280°C. in about 0.5 hour. After 2 hours at 280°C. at less than 1 torr, the vacuum is broken with nitrogen and the polymer is allowed to cool. The polymer is cut to flake. The flake has a relative viscosity of 24.3 and contains 0.063% nitrogen. The flake is solid phase polymerized for 48 hours at 190°C. and at less than 5 torr. The flake is spun to a 17-filament yarn at a pack block temperature of 282°C. and a spinneret temperature of 280°C., and is wound up undrawn at 300 yards (273 meters) per minute.

The yarn is drawn 3.9X in two stages. The yarn passes from a feed roll at 33.3 yards (30.3 meters) per minute over a hot pin at 70°C. to a first-stage draw roll having a speed of 105 yards (95.2 meters) per minute, over a hot plate at 105°C. to a second-stage draw roll having a speed of 130 yards (118.3 meters) per minute and is wound up at 129 yards (117.5 meters) per minute. The resulting 59-denier yarn has a tenacity of 3.3 grams per denier and an elongation of 4.3%.

Three such yarns are plied together and knit into fabric. The fabric dyes to medium shades at pH 3.5 and 4.5 at 100°C. and 121°C., and to light shades at pH 6 at 100°C. and 121°C. using the procedure described in Ex. 1C.

EXAMPLE V

This example illustrates the use of ETHP-114EO in preparing acid-dyeable polyester filaments.

In a two-liter, three-necked flask are mixed 95 grams of ETHP-114EO, 500 grams of di(2-hydroxyethyl)-terephthalate, and 0.28 gram of antimony oxide in 20 milliliters of ethylene glycol. Polymerization is carried out as in Example IV, except that the vacuum is held for 105 minutes. The polymer is allowed to cool under nitrogen and is cut to flake. The flake has a relative viscosity of 13.3 and contains 0.059% nitrogen. The flake is solid phase polymerized for 48 hours at 190°C. and less than 5 torr.

The polymer is spun to a 17-filament yarn at a pack block temperature of 282°C. and a spinneret temperature of 280°C. and is wound up at 300 yards (273 meters) per minute. The yarn is then drawn 3.9X in a separate step. The yarn passes from a feed roll at 33.3 yards (30.3 meters) per minute over a hot pin at 70°C. to a first-stage draw roll having a speed of 105 yards (95.2 meters) per minute, over a hot plate at 105°C. to a second-stage draw roll having a speed of 130 yards (118.3 meters) per minute and is wound up at 129 yards (117.5 meters) per minute. The resulting 60-denier yarn has a tenacity of 1.4 grams per denier and an elongation of 51%.

Skeins of this yarn are dyed at pH 3.5 at 100°C. and at pH 3.5 and 4.5 at 121°C. All dyeings are for 90 minutes with 15% on weight of skein (ows) carrier and 2% ows of C.I. Acid Blue 25 (C.I. 62055) and all skeins dye to a deep shade of blue.

EXAMPLE VI

This example illustrates the use of both PHP-28EO and ETHP-19EO in the preparation of an acid-dyeable polyester.

In a stainless steel distilling pot having a drain valve is placed 8.840 kilograms of dimethyl terephthalate, 8.661 kilograms of ethylene glycol and 200 milliliters of a glycol solution containing 2.8 grams of $Sb_2O_3$ and 4.2 grams of $Mn(C_2H_3O_2)_2 \cdot 4H_2O$. The mixture is heated at 220°C. over a 5-hour period during which time 3053 grams of methanol and 2000 grams of ethylene glycol are removed sequentially. The resulting monomer is drained to a stainless steel autoclave equipped with stirrer, charging port vacuum distillation system and extrusion valve. To the autoclave is added 40 milliliters of an ethylene glycol solution containing 2.08 milliliters of 85% $H_3PO_4$ and the contents stirred for 15 minutes. Then 133 milliliters of a 20%, by weight, $TiO_2$ dispersion in ethylene glycol is added. The $TiO_2$ dispersion also contains, per liter, 2.72 grams of a brightner and 0.654-gram of a blue toner. To the autoclave is then added a solution of 300 milliliters of ethylene glycol, 255.1 grams PHP-28EO and 376 grams of ETHP-19EO. The pressure is reduced slowly over a period of about 1.5 hours at 0.25-torr and maintained at that pressure at 285°C. for 4 hours. At the end of 4 hours, the melt is extruded, cooled and cut to 0.125-inch (0.315-centimeter) flake. The flake has a relative viscosity of 21.1 and contains 0.08% nitrogen.

The polymer is then spun into a 5-filament yarn at a spinneret temperature of 275°C. and wound to a package. In a separate step the yarn is drawn 5.2X on a hot pin at 75°C. The feed roll speed is 16.7 yards (15.3 meters) per minute, the draw roll speed is 86.7 yards (79.3 meters) per minute and the wind-up roll speed is 83.3 yards (76.2 meters) per minute. Two yarns produced as above are plied. The plied yarn has a denier of 53, a tenacity of 3.6 and an elongation of 27%. The yarn is knit into a fabric and the fabric dyed under pressure at 121°C. at pH 3 and 4.5 using the procedure described in Example 1C. The fabric dyes to a deep shade at pH 3 and medium to deep shade at pH 4.5.

EXAMPLE VII

This example illustrates a preferred method for preparing the acid-dyeable polyester fibers and dyeing them in a multi-dye bath.

A molten stream of ETHP-19EO having a temperature of about 120°C. is injected continuously into a molten stream of polyethylene terephthalate having a relative viscosity of 3–5. Injection is at such a rate as to provide 0.106% nitrogen in the final polymer. The combined ingredients are passed to a finisher held at 278°C. and at 1.8 torr. The flow of polymer out of the finisher is adjusted to give a holdup time of about 1.5 hours. The finished polymer has a relative viscosity of 20 and is spun at 270°C. through a 450-hole spinneret (orifice diameter of 0.381 millimeter to produce filaments which are collected as a yarn at 1,650 yards (1,511 meters) per minute. A creel stock is prepared from 40 of these yarns and the yarns are combined to form a tow which is drawn 3.28X in an aqueous draw bath at 70°C. The tow is then crimped, relaxed and cut to staple fibers. The copolymer fibers have a denier per filament of 3.2, a tenacity of 3.0 grams per denier and an elongation of 45%.

The above fibers are then spun on the mid-fiber spinning system to a singles yarn having a cotton count of 26 and about 19 turns per inch of Z twist. A commercial yarn of polyethylene terephthalate having a denier of 150 and 34 filaments is false twist textured at 210°C./230°C. A commercial yarn of a basic-dyeable copolyester having a denier of 150 and 34 filaments also is textured. The basic-dyeable copolyester is prepared from ethylene glycol, terephthalic acid (98 mole percent of acid units) and sodium 3,5-di(carbomethoxy) benzene sulfonate (2 mole percent of acid units) in accordance with the teaching of U.S. Pat. No. 3,018,272 issued to Griffing and Remington. The above 3 yarns are knit into a fabric on a 22-cut Fouquet Knitting Machine. The fabric has three bands with each of the above yarns in a separate band. A 10-gram swatch containing approximately equal amounts of the above yarns is dyed in a Model G7B Ahiba Dyeing Machine (Gubelin Int. Corp. of Mt. Kisco, N.Y.) using the following procedure where the percentages are based on the weight of the fabric.

The fabric is scoured 20 minutes at 82.2°C. in a bath containing 1% of a non-ionic surfactant based on the ethylene oxide condensate of a long chain linear alcohol and 1% of tetrasodium pyrophosphate. The fabric is then rinsed well. The rinsed fabric is then placed in a bath having a temperature of 37.8°C. Then 1% of the non-ionic surfactant described above and 1% of an amphoteric dyeing assistant based on the ethylene oxide adduct of a fatty amine, sodium sulfate and sodium formate is added. The sulfate is added to give 6 grams per liter and the formate 4 grams per liter. The bath is then agitated for 5 minutes and 10% of a dye carrier consisting of a solvent mixture added, the bath is agitated another 5 minutes and 1.10% of a mixture of C.I. Basic Blues, 0.40% C.I. Basic Blue 22, 0.55% C.I. Basic Orange 26 and 0.55% of C.I. Basic Orange 21 (C.I. 48035) added. The bath is then agitated 5 minutes and 0.2% C.I. Dispersed Yellow 54 (C.I. 47020) is added and the bath agitated another 5 minutes and the pH adjusted to 3.5 with formic acid. The bath is then heated to 76.7°C. at 1.1°C. per minute. Then 0.17% C.I. Acid Blue 25 (C.I. 62055) is added and the bath agitated 5 minutes. The pH of the bath is then readjusted to 3.5 and the bath temperature increased to 100°C. at 1.1°C. per minute and dyeing continued for 1.5 hours. The solution is allowed to cool to 71.1°C. and the fabric rinsed well in hot tap water. The dyed fabric is then scoured 20 minutes at 71.1°C. in a bath containing 1% of the non-ionic surfactant described above and 0.5% acetic acid. The fabric is rinsed in hot tap water and then dried. The dyed fabric is then heat set for 1 minute at 176.7°C. in a Laboratory High Temperature Oven (Electric Hotpack Corp., Philadelphia, Pennsylvania) and then removed and the heat setting step repeated. The polyethylene terephthalate fibers are dyed yellow, the basic-dyeable polyester fibers are dyed brown and the fibers of this invention are dyed green.

We claim:

1. Acid dyeable polyester fibers or filaments comprising, as integral components in linear polyester chains, a minor proportion sufficient to provide at least 0.05 weight percent nitrogen, of 2,2,6,6-tetramethylpiperidine groups linked to dicarboxylate chain units through substituents at both the 1 and 4 positions of the piperidine ring which contain oxyethylene units, and the number of oxyethylene units in such linking substituents on tetramethylpiperidine groups in the polyester averages at least 10 oxyethylene units per tetramethylpiperidine group.

2. Fibers or filaments as defined in claim 1 wherein the tetramethylpiperidine groups provide 0.05 to 0.25 percent nitrogen based on the weight of the polyester.

3. Fibers or filaments as defined in claim 1 wherein the polyester comprises at least 85 mole percent ethylene terephthalate units.

4. Fibers or filaments as defined in Claim 3 wherein the polyester comprises up to 10 weight percent ethylene adipate or ethylene glutarate units.

5. Fibers or filaments as defined in claim 1 wherein there are an average of 10 to 80 oxyethylene units per tetramethylpiperidine group.

6. Fibers or filaments as defined in claim 1 wherein the tetramethylpiperidine groups and linking substituents are represented by the following formula:

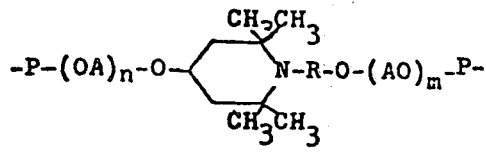

wherein P represents a segment of a polyester chain having a terminal carbonyl group; $-(OA)_n-$ and $-(AO)_m-$ represent divalent groups of $n$ and $m$ oxyalkylene units which contain a total of at least 10 oxyethylene units, and R is a saturated aliphatic divalent hydrocarbon group of 2 to 18 carbon atoms.

7. Fibers or filaments as defined in claim 6 wherein said oxyalkylene units are a mixture of oxyethylene and oxypropylene units of which at least one-half are oxyethylene units.

8. Fibers or filaments as defined in claim 6 wherein the substituted tetramethylpiperidine is an alkylene oxide condensate of 1-(2-hydroxyethyl)-2,2,6,6-tetramethyl-4-hydroxypiperidine.

9. Fibers or filaments as defined in claim 6 wherein the substituted tetramethylpiperidine is an alkylene oxide condensate of 1-(2-hydroxy-2-methylethyl)-2,2,6,6-tetramethyl-4-hydroxypiperidine.

10. Fibers or filaments as defined in claim 6 wherein the substituted tetramethylpiperidine is an ethylene oxide condensate of 1-(2-hydroxyethyl)-2,2,6,6-tetramethylpiperidine containing an average of about 20 ethylene oxide units per tetramethylpiperidine group.

* * * * *